(12) United States Patent
Naam et al.

(10) Patent No.: US 7,363,296 B1
(45) Date of Patent: *Apr. 22, 2008

(54) GENERATING A SUBINDEX WITH RELEVANT ATTRIBUTES TO IMPROVE QUERYING

(75) Inventors: Ramez Naam, Seattle, WA (US); Nicole Ashley Hamilton, Redmond, WA (US); Oliver Hurst-Hiller, Seattle, WA (US); Brett D. Brewer, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 594 days.

This patent is subject to a terminal disclaimer.

(21) Appl. No.: 10/883,108

(22) Filed: Jul. 1, 2004

(51) Int. Cl.
*G06F 7/00* (2006.01)
*G06F 17/30* (2006.01)

(52) U.S. Cl. ................................. 707/3; 707/5

(58) Field of Classification Search ............... 707/1–10
See application file for complete search history.

(56) References Cited

U.S. PATENT DOCUMENTS

| 4,417,321 | A | 11/1983 | Chang et al. |
|---|---|---|---|
| 6,070,158 | A | 5/2000 | Kirsch et al. |
| 6,178,419 | B1 | 1/2001 | Legh-Smith et al. |
| 6,334,131 | B2 | 12/2001 | Chakrabarti et al. |
| 6,526,440 | B1 | 2/2003 | Bharat |
| 6,529,903 | B2 | 3/2003 | Smith et al. |
| 6,606,620 | B1 | 8/2003 | Sundaresan et al. |
| 6,615,209 | B1 | 9/2003 | Gomes et al. |
| 6,658,423 | B1 | 12/2003 | Pugh et al. |
| 6,678,681 | B1 | 1/2004 | Brin |
| 6,701,314 | B1 | 3/2004 | Conover et al. |
| 6,714,929 | B1 | 3/2004 | Micaelian et al. |
| 6,725,259 | B1 * | 4/2004 | Bharat ....................... 709/219 |
| 6,728,932 | B1 | 4/2004 | Chundi et al. |

(Continued)

FOREIGN PATENT DOCUMENTS

WO   WO 01/46870 A1   6/2001

(Continued)

OTHER PUBLICATIONS

Abdur Chowdhury and Ian Soboroff,"Automatic Evaluation of World Wide Web Search Services", ACM, SIGIR 2002.*

(Continued)

*Primary Examiner*—Hosain Alam
*Assistant Examiner*—Shew-Fen Lin
(74) *Attorney, Agent, or Firm*—Senniger Powers LLP (57) ABSTRACT

Rating information retrieval algorithms. A query is received and submitted to a search engine for execution on an index file. A list of index documents and a plurality of attributes are received from the search engine in response to the submitted query. A portion of the received list of index documents and the received plurality of attributes are stored in a subindex file. The received query is executed on the subindex file to obtain a list of subindex documents. The obtained list of subindex documents is ranked by a particular ranking algorithm using the attributes associated therewith. The list of ranked subindex documents is compared with a list of subjectively ranked documents to generate a score for the particular ranking algorithm. The generated score represents a degree of correlation between the list of ranked subindex documents and the list of subjectively ranked documents.

17 Claims, 6 Drawing Sheets

U.S. PATENT DOCUMENTS

| | | | |
|---|---|---|---|
| 6,757,667 B1 | 6/2004 | Patel | |
| 6,785,671 B1 | 8/2004 | Bailey et al. | |
| 6,810,395 B1* | 10/2004 | Bharat | 707/4 |
| 6,944,609 B2* | 9/2005 | Witbrock | 707/3 |
| 7,003,513 B2* | 2/2006 | Geiselhart | 707/5 |
| 7,010,527 B2 | 3/2006 | Alpha | |
| 7,219,090 B2* | 5/2007 | Travis, Jr. | 707/3 |
| 7,219,099 B2* | 5/2007 | Kuntala et al. | 707/100 |
| 2002/0123988 A1 | 9/2002 | Dean et al. | |
| 2002/0133481 A1 | 9/2002 | Smith et al. | |
| 2003/0212699 A1 | 11/2003 | Denesuk et al. | |
| 2004/0002973 A1 | 1/2004 | Chaudhuri et al. | |
| 2004/0010497 A1 | 1/2004 | Bradley et al. | |
| 2004/0049514 A1 | 3/2004 | Burkov | |
| 2004/0199419 A1* | 10/2004 | Kim et al. | 705/14 |
| 2005/0149504 A1 | 7/2005 | Ratnaparkhi | |
| 2005/0210042 A1 | 9/2005 | Goedken | |
| 2005/0234904 A1 | 10/2005 | Brill et al. | |

FOREIGN PATENT DOCUMENTS

| | | |
|---|---|---|
| WO | WO 01/55905 A1 | 8/2001 |
| WO | WO 02/41190 A2 | 5/2002 |

OTHER PUBLICATIONS

Brin, S. et al., "The Anatomy of a Large-Scale Hypertextual Web Search Engine" Proceedings of the 7th International World Wide Web Conference, 1998, 18 pages, available at http://www7.scu.edu.au/programme/fullpapers/1921/com1921.htm WWW Consortium, Australia.

Joachims, "Optimizing Search Engines Using Clickthrough Data," Proceedings of the Eighth ACM SIGKDD International Conference on Knowledge Discovery, 2002, pp. 133-142, ACM Press, New York, U.S.A.

Chowdhury et al., "Automatic Evaluation of World Wide Web Search Services," Proceedings of the 25th Annual International ACM SIGIR Conference on Research and Development in Information Retrieval, 2002, pp. 421-422, ACM Press, New York, U.S.A.

Salzberg, et al., "Comparison of Access Methods for Time-Evolving Data," ACM Computing Surveys (CSUR), Jun. 1999, pp. 158-221, vol. 31, Issue 2, ACM Press, New York, U.S.A.

Singhal et al., "A Case Study in Web Search Using TREC Algorithms," Proceedings of the Tenth International Conference on World Wide Web, 2001, pp. 708-716, ACM Press, New York, U.S.A.

Zhang et al., "Question Classification Using Support Vector Machines," Proceedings of the 26th Annual International ACM SIGIR Conference on Research and Development in Information Retrieval, 2003, pp. 26-32, ACM Press, New York, U.S.A.

Sormunen, "Liberal Relevance Criteria of TREC—Counting on Negligible Documents?", Proceedings of the 25th Annual International ACM SIGIR Conference on Research and Development in Information Retrieval, 2002, pp. 324-330, ACM Press, New York, U.S.A.

Freund et al., "An Efficient Boosting Algorithm for Combining Preferences," The Journal of Machine Learning Research, 2003, pp. 933-969, vol. 4, MIT Press, Cambridge, MA, U.S.A.

Crammer et al., "A Family of Additive Online Algorithms for Category Ranking," The Journal of Machine Learning Research, 2003, pp. 1025-1058, vol. 3, MIT Press, Cambridge, MA, U.S.A.

Goffe, "Abstract: Simulated Annealing—Global Optimization Method That Distinguishes Between Different Local Optima," 1995, available at http://emlab.berkeley.edu/Software/abstracts/goffe895.html, 2 pages.

* cited by examiner

GENERATING A SUBINDEX WITH RELEVANT ATTRIBUTES TO IMPROVE QUERYING

TECHNICAL FIELD

Embodiments of the present invention relate to the field of information retrieval. In particular, embodiments of the invention relate to evaluating information retrieval ranking algorithms and improving ranking algorithms for information retrieval.

BACKGROUND OF THE INVENTION

The Internet has vast amounts of information distributed over a multitude of computers, hence providing users with large amounts of information on various topics. This is also true for a number of other communication networks, such as intranets and extranets. Although large amounts of information may be available on a network, finding the desired information can be difficult.

Search engines have been developed to address the problem of finding desired information on a network. Typically, a user who has an idea of the type of information desired enters one or more search terms to a search engine. The search engine then returns a list of network locations (e.g., uniform resource locators (URLs)) that the search engine has determined to include an electronic document relating to the user-specified search terms. Many search engines also provide a relevance ranking. A typical relevance ranking is a relative estimate of the likelihood that an electronic document at a given network location is related to the user-specified search terms in comparison to other electronic documents. For example, a conventional search engine may provide a relevance ranking based on the number of times a particular search term appears in an electronic document, its placement in the electronic document (e.g., a term appearing in the title is often deemed more important than the term appearing at the end of the electronic document). In addition, link analysis has also become a powerful technique in ranking web pages and other hyperlinked documents. Anchor-text analysis, web page structure analysis, the use of a key term listing, and the URL text are other techniques used to provide a relevance ranking.

Many search engines employ various ranking algorithms to produce such a relevance ranking reflecting the relative importance of the different electronic documents resulting from a search query. The ability of current ranking algorithms to produce an accurate relevance ranking depends on numerous, tunable dimensions or other parameters (e.g., 200 or more). Thus, a technique to identify an optimal ranking algorithm that has optimal dimensions or parameters for producing an accurate relevance ranking is desired.

In some existing systems and methods, human intuition is used to tune the parameters of a given ranking algorithm in an attempt to produce a relevance ranking that is correlated to a human-judged ranking of electronic documents. However, human intuition fails to identify an optimal ranking algorithm with optimal parameters efficiently, reliably, and effectively.

In some fields of computer science, "best fit" or "minima/maxima seeking" algorithms are used to solve various problems. A technique that applies these algorithms to explore a multi-dimensional space of parameters associated with a ranking algorithm is generally desired. However, a given ranking algorithm may have an order of 50 to 100 parameters. If each parameter has 10 possible values, there will be $10^{50}$ to $10^{100}$ possible combinations of parameters for the given ranking algorithm. This large space of combinations renders searching of an optimal set of parameters difficult. Moreover, because of the potentially billions of electronic documents located on a network, executing an optimizing algorithm on these billions of electronic documents to identify an optimal ranking algorithm is time consuming. In other words, searching a large index of electronic documents to identify an optimal ranking algorithm having a set of optimal parameters is impractical.

In existing frameworks for identifying an optimal ranking algorithm, the optimizing algorithm utilized to identify the optimal ranking algorithm is usually "hard-coded" in the frameworks. As a result, changes to the optimizing algorithm in such frameworks usually require code-level changes, which are then distributed to other machines if the index of electronic documents is spread across multiple machines. Therefore, a framework that provides interchangeable optimizing algorithms is desired such that an optimizing algorithm may be easily upgraded or substituted.

Accordingly, a solution that effectively evaluates information retrieval ranking algorithms and improves ranking algorithms for information retrieval is desired.

SUMMARY OF THE INVENTION

Embodiments of the invention overcome one or more deficiencies in the prior art by providing, among other things, evaluation and improvement of information retrieval ranking algorithms. In particular, embodiments of the invention provide a framework for identifying an optimal ranking algorithm that accurately ranks tens of billions of electronic documents. According to one or more embodiments of the invention, a subindex storing relevant attributes of electronic documents is generated as a function of a search query to facilitate the process of identifying an optimal ranking algorithm. In particular, an embodiment of the invention rates various ranking algorithms by applying the search query to the subindex to produce search results, iteratively applying the ranking algorithms to the search results to produce ranked query results, and comparing the ranked query results with human judgments to produce the rating.

According to one embodiment, the invention employs an optimizing algorithm to explore a parameter space of a set of predefined ranking algorithms, including the ratings associated with each of the ranking algorithms, to identify an optimal ranking algorithm and a set of optimal parameters associated with the optimal ranking algorithm. In particular, the framework receives a large number of parameter permutations (e.g., tens to hundreds of millions of parameters resulting in trillions of permutations) and determines a set of optimal parameters. Embodiments of the invention also allow interchangeability of the optimizing algorithm such that other optimizing algorithms may be added to the framework with minimal effort.

Thus, embodiments of the invention result in an efficient system and method for identifying an optimal ranking algorithm and the associated optimal parameters.

In accordance with one aspect of the invention, a method rates information retrieval ranking algorithms. The method includes receiving a query and submitting the received query to a search engine for execution on an index file. The index file stores a plurality of documents. The method also includes receiving a list of index documents and a plurality of attributes from the search engine in response to the submitted query. The plurality of attributes includes data describing the received list of index documents. The method further includes storing a portion of the received list of index documents and the received plurality of attributes associated therewith in a subindex file. The method includes executing the received query on the subindex file to obtain a list of subindex documents and ranking, by a particular ranking algorithm, the obtained list of subindex documents using the attributes associated therewith. The method also includes comparing the list of ranked subindex documents with a list of subjectively ranked documents to generate a score for the particular ranking algorithm. The generated score represents a degree of correlation between the list of ranked subindex documents and the list of subjectively ranked documents.

In accordance with another aspect of the invention, one or more computer-readable media have computer-executable components for rating information retrieval ranking algorithms. The components include an interface component for receiving a query, a list of index documents resulting from execution of the query on an index file storing a plurality of documents, and a plurality of attributes including data describing the list of index documents. The components also include a memory component for storing, in a subindex file, a portion of the list of index documents and the plurality of attributes associated therewith received by the interface component. The components further include a ranking component for executing the received query on the subindex file to obtain a list of subindex documents and for ranking, by a particular ranking algorithm, the obtained list of subindex documents using the attributes associated therewith. The components also include a comparator component for comparing the list of subindex documents ranked by the ranking component with a list of subjectively ranked documents to generate a score for the particular ranking algorithm. The generated score represents a degree of correlation between the list of subindex documents ranked by the ranking component and the list of subjectively ranked documents.

In accordance with still another aspect of the invention, a computer-readable medium stores a data structure representing a subindex file created from an index file as a function of a particular query executed on the index file, wherein execution of the particular query on the index file results in a list of documents. The data structure includes a first field storing a portion of the list of documents. The data structure also includes a second field storing a plurality of attributes related to the portion of the list of documents stored in the first field.

In accordance with yet another aspect of the invention, a system analyzes the performance of ranking algorithms with reference to subjective rankings. The system includes a memory area for storing an index file with a list of index documents and a subindex file with a list of subindex documents. The list of subindex documents represents a portion of the list of index documents. The portion is determined as a function of a particular query being executed on the index file. The system also includes a memory area for storing a plurality of ranking algorithms for ranking the list of subindex documents in the subindex file. The system also includes a memory area for storing a subjectively ranked list of subindex documents. The system also includes a memory area for storing a processor configured to execute computer-executable instructions to compare the list of subindex documents ranked by each of the plurality of ranking algorithms with the subjectively ranked list of subindex documents to determine a score for each of the plurality of ranking algorithms. The determined score represents a degree of correlation between the ranked list of subindex documents and the subjectively ranked list of subindex documents.

Computer-readable media having computer-executable instructions for performing methods of rating information retrieval ranking algorithms and improving ranking algorithms for information retrieval embody further aspects of the invention.

Alternatively, embodiments of the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Figure 1:
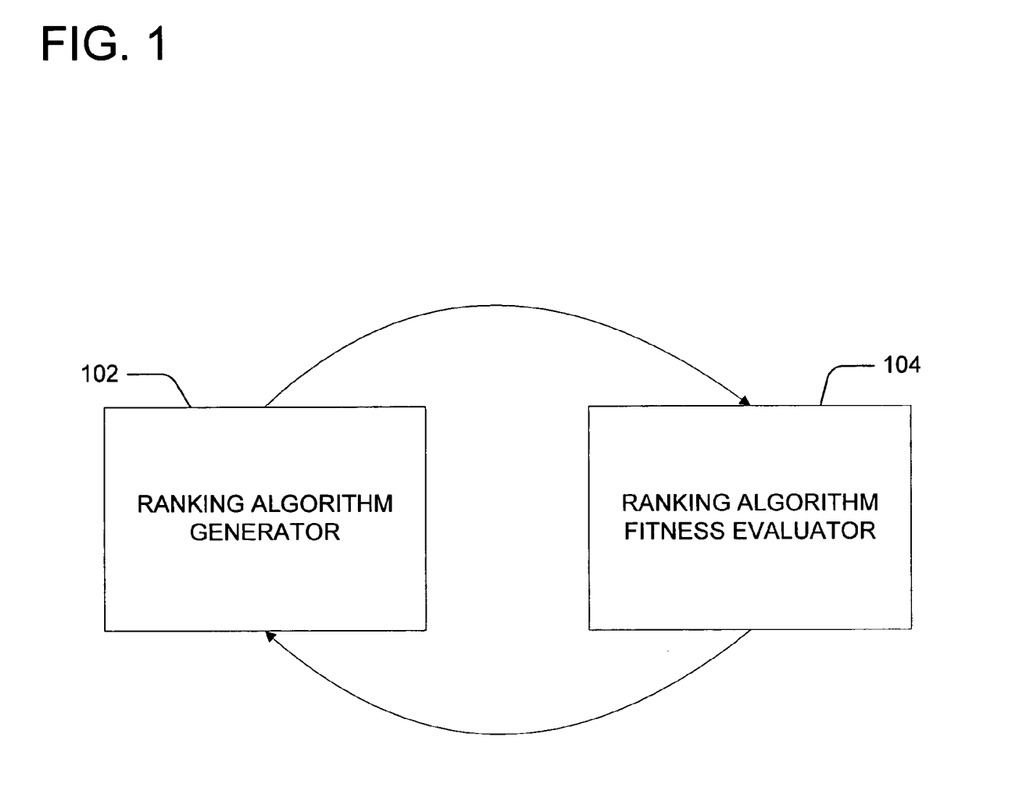
FIG. 1 is a block diagram illustrating an exemplary framework in which embodiments of the present invention may be utilized.

Referring first to FIG. 1, a block diagram illustrates one example of a suitable framework in which embodiments of the invention may be utilized. A ranking algorithm generator 102 is configured to receive a set of ranking algorithms and to produce a new set of ranking algorithms based on the received set of ranking algorithms. A ranking algorithm fitness evaluator 104 is configured to determine the effectiveness of a given ranking algorithm in producing a relevance ranking that accurately reflects the relative importance of electronic documents with respect to a search query. In one embodiment of the invention, the ranking algorithm generator 102 (or alternatively, a human operator) creates an initial set of ranking algorithms and communicates the created set of ranking algorithms to the ranking algorithm fitness evaluator 104. Ranking algorithm fitness evaluator 104 then evaluates each of the ranking algorithms and identifies the most effective ranking algorithm in the set. Ranking algorithm fitness evaluator 104 further communicates the most effective ranking algorithm that it identifies in the set to ranking algorithm generator 102. Based on the most effective ranking algorithm identified by ranking algorithm fitness evaluator 104, ranking algorithm generator 102 produces a new set of ranking algorithms (e.g., using a genetic algorithm or evolutionary algorithm). Ranking algorithm generator 102 again communicates this new set of ranking algorithms to ranking algorithm fitness evaluator 104. Ranking algorithm fitness evaluator further identifies the most effective ranking algorithm in the new set. This framework of ranking algorithm generator 102 and ranking algorithm fitness evaluator 104, which produce a set of ranking algorithms and identify the most effective ranking algorithm in the set, respectively, is iterated to find an optimal ranking algorithm that produces an optimal relevance ranking for a given search query.

Ranking Algorithms

According to an embodiment of the invention, a particular ranking algorithm may perform dynamic ranking. Dynamic ranking is a process that ranks electronic documents determined to match a search query. Searching and dynamic ranking are well known in the art. Generally, the ranking algorithm calculates a single numeric value called the ranking score for each electronic document determined to match the search query. The ranking score represents how well the electronic document matches the search query. A query processor then orders matching electronic documents based on their corresponding ranking scores (e.g., an electronic document with a higher ranking score may be ordered higher in the relevance ranking).

The ranking algorithm that calculates the ranking score is a function that takes several arguments as inputs. One of such arguments is an attribute that represents various information about an electronic document and about how well the electronic document matches a search query. Such an attribute may be document-specific and query-independent. For example, document-specific attributes may include static rank, length of the electronic document, link structure (e.g., how many links point to the electronic document), age of the electronic document, depth of the electronic document within a domain, language of the electronic document, country of the electronic document, etc. The attribute may also be query-specific and independent of the electronic document. Such query-specific attributes may include a frequency of an individual query term across the electronic document in various document locations (e.g., anchor text, title, body, etc.). Certain attributes also describe how well the electronic document matches one or more query terms specified in the search query. Such attributes may include a frequency of each query term, phrase, or span in the title, body, anchor text, URL, etc. of the electronic document. Alternatively, such attributes may assume binary values (e.g., "some query terms appear in the title of the electronic document" or "too many matches").

Another argument representative of an input to the ranking algorithm is a parameter. A parameter is a variable that is used as a weight or constant (e.g., a parameter with zero range) in the ranking algorithm that combines the attributes for a given (document, query) pair. Since a parameter may change constantly, it is not hard-coded in the ranking algorithm but is stored in a configuration file such that changes to the parameter are isolated from code changes. One of the goals of ranking algorithm generator 102 is that for a given set of training search queries and their predetermined ratings, to find a set of optimal parameters for a given ranking algorithm such that the relevance ranking produced by the ranking algorithm will match the predetermined ratings as closely as possible.

For each search result, there may be two different types of attributes and parameters. Static attributes and parameters have one instance per query. Examples of such static attributes and parameters include static ranks and weights to be given to the static ranks. On the other hand, dynamic attributes and parameters may occur in multiple types for a given search result. Examples of dynamic attributes include "frequency in anchor text," "frequency in body," etc., and the corresponding types may be "query term 1," "query term 2," "matched phrase," etc. Dynamic parameters assume different attributes (and have different ranges) depending on what the current type is. Similarly, a ranking algorithm may be either dynamic or static. A dynamic ranking algorithm combines dynamic attributes and parameters for each type instance given for a search result. A static ranking algorithm combines static items (such as attributes, parameters, other results of the ranking algorithm) and optimally dynamic results.

Figure 2:
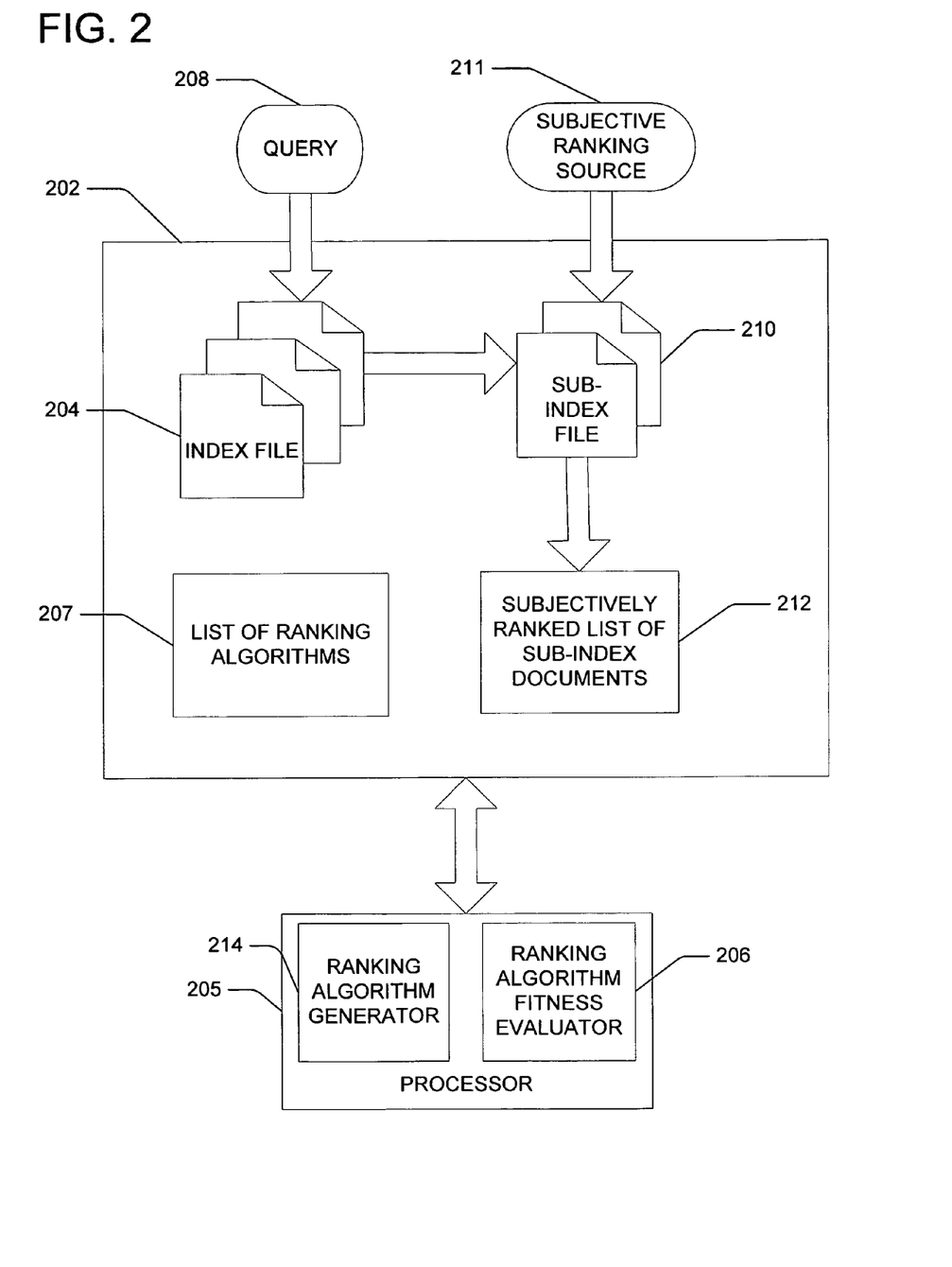
FIG. 2 is a block diagram illustrating an exemplary implementation of a framework to evaluate and improve a ranking algorithm according to one embodiment of the invention.

Referring to FIG. 2, a block diagram illustrates an exemplary implementation of a framework to evaluate and improve a ranking algorithm according to one embodiment of the invention. FIG. 2 shows a memory area 202. The memory area 202 stores an index file 204. The index file 204 includes reference information and pointers to a plurality of electronic documents located on a communications network (e.g., an intranet, an extranet, or the Internet) to which the reference information applies. Thus, index file 204 may include one or more index terms identified from electronic documents collected by a crawler and analyzed by an index builder (not shown). Index file 204 further stores a list of network locations (e.g., URLs or internet protocol (IP) addresses) for a stored index term. A network location may be used to locate an electronic document on a communications network that includes data corresponding to the index term.

Rating the Ranking Algorithm

In FIG. 2, a processor 205 implements a ranking algorithm fitness evaluator 206 to evaluate a list 207 of ranking algorithms stored in memory area 202. Specifically, the processor 205 receives a query 208 and executes the query 208 on index file 204. The query 208 may be a web search query for a business listing, residential listing, mail item, news item, media content (e.g., an image, video content, audio content, etc.), product, or service. Based on query 208, processor 205 parses index file 204 to determine if one or more query terms of query 208 correspond to an index term stored in index file 204. If one or more query terms of query 208 correspond to a stored index term, processor 205 then generates a subindex file 210 as a function of executing query 208 on index file 204. In an embodiment of the invention, the subindex file 210 stores information regarding a few hundred electronic documents. In particular, subindex file 210 stores a list of document IDs representative of electronic documents that include one or more index terms determined by processor 205 as corresponding to the query terms specified in query 208. Accordingly, subindex file 210 represents a portion of index file 204 and is generated based on query 208. That is, subindex file 210 stores information regarding electronic documents initially included in index file 204 and determined by processor 205 as "hits" of query 208. Subindex file 210 further stores a list of attributes relevant to the query terms specified in query 208. For example, if query 208 specifies the term "college" as a query term, then subindex file 210 may store a list of attributes relevant to the term "college" but may not store attributes that are irrelevant to this query term.

After processor 205 generates subindex file 210, a subjective ranking source 211 analyzes the electronic documents included in subindex file 210 based on query 208 to determine a subjective ranking of the electronic documents. More specifically, the subjective ranking source 211 looks at each of the electronic documents included in subindex file 210 and determines a degree of correlation between each electronic document and the query terms specified in query 208. Based on this degree of correlation, subjective ranking source 211 determines a subjective score for each electronic document and produces a subjectively ranked list 212 of subindex documents based on the subjective scores of the electronic documents. In an embodiment of the invention, an electronic document with a higher subjective score is ordered higher in the subjectively ranked list 212 than an electronic document with a lower subjective score. Subjectively ranked list 212 of subindex documents is then stored in memory area 202.

Evaluating the ranking algorithms based on subindex file 210 rather than on the index file 204 provides improved efficiency and practicality. For example, subindex file 210 may be substantially smaller in size than the index file 204. As such, performing operations on the subindex file 210 involves reduced processing time.

As one particular example, if query 208 specifies the term "college" as a query term, subindex file 210 will include electronic documents having the term "college." Accordingly, subjective ranking source 211 may look at each of these electronic documents having the term "college" and determine the relevancy of each electronic document with respect to query 208. Subjective ranking source 211 then generates a subjective score for each electronic document based on the determined relevancy of this particular electronic document to query 208. Subjective ranking source 211 then orders the electronic documents having the term "college" based on their subjective scores to form subjectively ranked list 212.

According to one embodiment of the invention, subjective ranking source 211 is a human who analyzes the electronic documents listed in subindex file 210. Alternatively, subjective ranking source 211 may be a programming instruction or software program configured to analyze these electronic documents automatically. For example, such a programming instruction or software program may be trained by machine learning to generate subjective scores for the electronic documents listed in subindex file 210. Additionally, subjectively ranked list 212 of subindex documents may be stored in subindex file 210. However, it is contemplated that subjectively ranked list 212 is accessible to processor 205 but not stored in subindex file 210.

As discussed, memory area 202 also stores the list 207 of ranking algorithms. The list 207 of ranking algorithms may be selected by a human or by a genetic algorithm. Each of the ranking algorithms in list 207 is configured to rank the electronic documents included in subindex file 210. In one embodiment of the invention, memory area 202 further stores a configuration file that includes one or more sets of potential parameters for each ranking algorithm and one or more sets of weights for each set of potential parameters. Alternatively, memory area 202 may store a range of weights for each parameter.

Processor 205 implementing the ranking algorithm fitness evaluator 206 is configured to execute query 208 on subindex file 210 to obtain a list of subindex documents. Processor 205 also executes each of the ranking algorithms included in list 207 on the list of subindex documents to obtain a relevance ranking of the subindex documents based on one or more attributes associated with each subindex document. The relevance ranking orders the subindex documents based on a degree of correlation between each subindex document and query 208 as determined by a given ranking algorithm.

In an embodiment of the invention, processor 205 implementing ranking algorithm fitness evaluator 206 further executes computer-executable instructions to compare the relevance ranking produced by each ranking algorithm with subjectively ranked list 212 to calculate a comparison score for each ranking algorithm included in list 207. The comparison score indicates a degree of correlation or similarity between the relevance ranking produced by a particular ranking algorithm and subjectively ranked list 212. Based on the comparison score calculated for each ranking algorithm, processor 205 may determine which of the ranking algorithms produces a relevance ranking that most resembles subjectively ranked list 212 and thus most accurately ranks the electronic documents included in subindex file 210.

After processor 205 generates the comparison score for each ranking algorithm, it produces an output file that stores each of the comparison scores and information describing each of the ranking algorithms. The output file also stores causal information relating a difference between a particular ranking algorithm and another ranking algorithm with a difference between the comparison scores of these ranking algorithms. Therefore, an operator may receive the output file and examine the information included in the output file to analyze the reason behind the relative comparison scores of the ranking algorithms and to determine a technique to improve a ranking algorithm for producing an accurate relevance ranking.

According to an embodiment of the invention, processor 205 or another processor implements a ranking algorithm generator 214 to improve a given ranking algorithm included in list 207. As discussed, memory area 202 stores one or more sets of potential parameters for a given ranking algorithm and one or more sets of weights associated with these parameters. Thus, processor 205 is configured to iteratively vary at least one of the parameters (and the associated weight) of a given ranking algorithm to generate a different ranking algorithm. More specifically, a particular ranking algorithm may have a plurality of parameters and weights associated therewith, and processor 205 implementing the ranking algorithm generator 214 may generate a different ranking algorithm by varying one or more of the parameters and weights of the particular ranking algorithm using the sets of parameters and weights stored in memory area 202 as inputs. Therefore, processor 205 may iteratively vary one or more parameters of a ranking algorithm and execute the ranking algorithm with varied parameters (and weights) on subindex documents to produce various comparison scores. As one an example, a particular ranking algorithm may include the function $X^2+X^3$, where X and Y represent two different parameters of the ranking algorithm. Accordingly, processor 205 implementing ranking algorithm generator 214 may vary the values of X and Y to produce different functions and thus different ranking algorithms. Applying the different ranking algorithms to the subindex documents and comparing the ranked results to the subjectively ranked list 212 produces various comparison scores.

The ranking algorithms (including various sets of parameters and weights), the comparison scores, and other output data (e.g., a set of scoring components for each search result to explain how the parameters are derived) may be used to determine an optimal ranking algorithm, as discussed next.

Determining an Optimal Ranking Algorithm

Processor 205 repeatedly varies the parameters and weights to identify an optimal ranking algorithm with an optimal set of parameters and weights such that the comparison score of the optimal ranking algorithm indicates that a relevance ranking produced by the optimal ranking algorithm highly resembles subjectively ranked list 212. In particular, processor 205 is configured to apply an optimizing algorithm to search a multi-dimensional space of parameters and weights to identify an optimal ranking algorithm having an optimal comparison score. The optimal ranking algorithm identified by the optimizing algorithm is defined by a plurality of optimal parameters and a plurality of optimal weights associated with the optimal parameters.

It is noted that an operator or a genetic algorithm may select the list 207 of ranking algorithms by choosing a set of mathematical functions and specifying what arguments they take. Arguments include, for example, attributes, parameters, constants, or results of previously defined functions. In a recursive approach, the operator or genetic algorithm models a ranking algorithm by combining basic functions. Processor 205 implementing ranking algorithm generator 214 takes as an input a training set of queries (e.g., query 208) and search results to find an optimal ranking algorithm. Essentially, each search result includes a number of attributes that are used in a ranking algorithm along with a rating that describes the quality of the search result with respect to its corresponding query. Two types of ratings may be used as inputs to rating algorithm generator 214: definitive rating (0—not definitive, 1—definitive) and scale rating (e.g., 5-point scale).

Processor 205 implementing ranking algorithm generator 214 searches the space of possible values for each parameter to identify a combination of parameters that result in a "good" ranking of query 208. In general, for a good ranking, electronic documents with higher ratings occur before electronic documents with lower ratings in a search result. This is generally referred to as the "quality of ranking." For a definitive rating, for each ranking, the quality is 1/(position of definitive). The output of ranking algorithm generator 214 of processor 205 includes a set of optimal parameters and a set of optimal weights associated with the optimal parameters.

However, for a typical ranking algorithm, there may be an order of 50-100 parameters. Even if ranking algorithm generator 214 considers 10 values for each parameter, there may be $10^{50}$ to $10^{100}$ possible combinations of parameters. Thus, in one embodiment of the invention, the optimizing algorithm executed by ranking algorithm generator 214 of processor 205 may be a binary search algorithm. For instance, the binary search algorithm may initially consider two values (e.g., 25th and 75th percentiles) for each parameter. For 30 parameters, this results in $2^{30}$ possible combinations of parameters. The binary search algorithm then keeps the better combination of these two values for each parameter and determines if each parameter is set to the 25th or 75th percentile. The binary search algorithm then reduces the range for each parameter to half of the original range. This technique is repeated a number of times to gradually refine the parameter.

Embodiments of the invention thus provide a framework for ranking algorithm optimization. It is noted that a wide range of optimizing algorithms or heuristics may be used to identify an optimal ranking algorithm. For example, the binary search algorithm may be substituted in the framework with other optimizing algorithms such as non-linear optimization techniques, machine learning, neural networks, and regression models to tune the parameter space.

In an embodiment of the invention, input information is received and stored in memory area 202. The input information describes a first ranking algorithm, a first score associated with the first ranking algorithm, a second ranking algorithm, a second score associated with the second ranking algorithm, and causal information relating a difference between the first ranking algorithm and the second ranking algorithm with a difference between the first score and the second score. Processor 205 then executes an optimizing algorithm such as a binary search algorithm or machine learning to the input information stored in memory area 202 to identify an optimal ranking algorithm having an optimal comparison score. The optimizing algorithm is interchangeable with another optimizing algorithm without re-compilation of software of the invention.

Exemplary Operation

Figure 3:
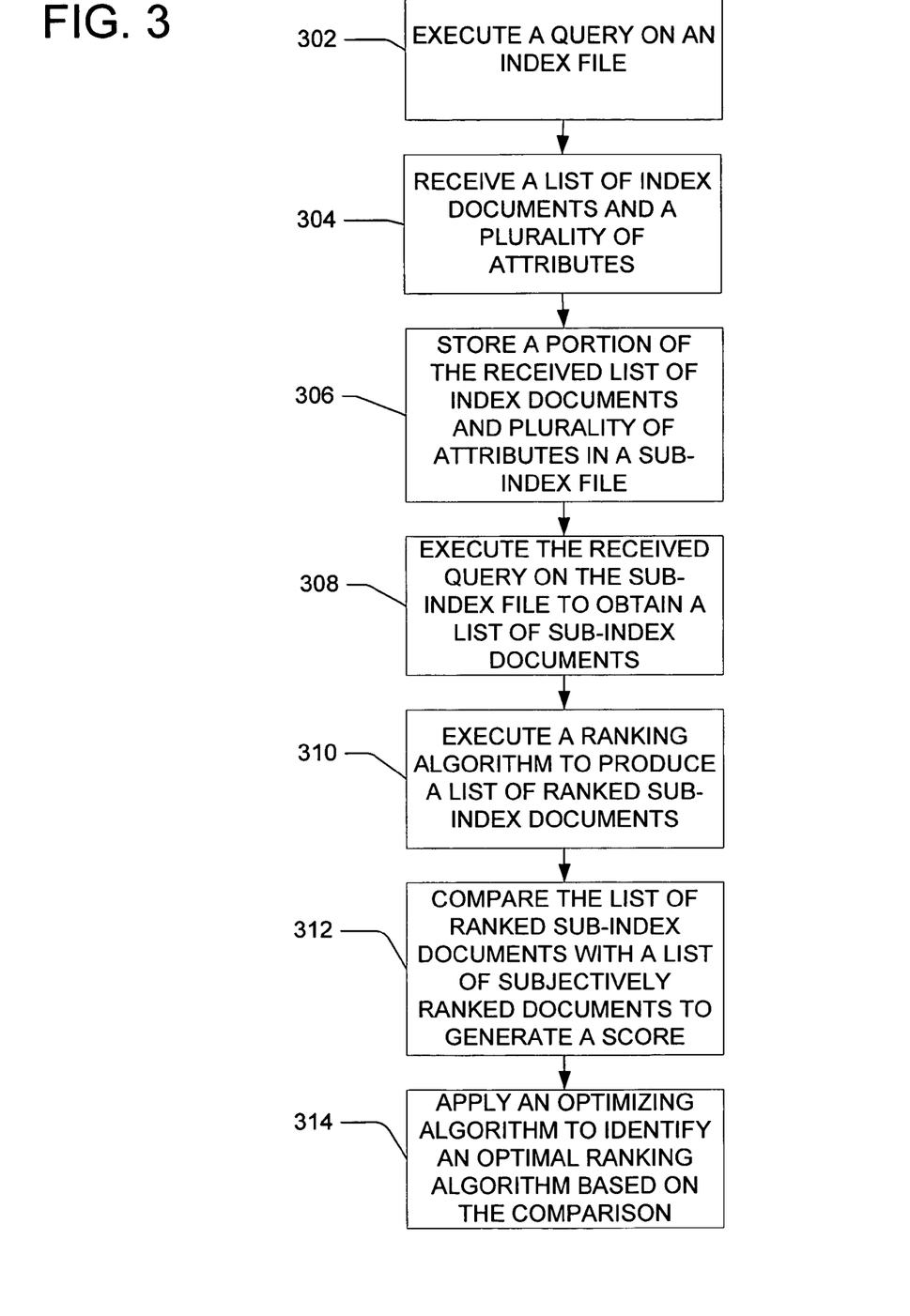
FIG. 3 is an exemplary flow diagram illustrating process flow according to one embodiment of the invention for evaluating and improving a ranking algorithm.

FIG. 3 illustrates an exemplary method for evaluating and improving a ranking algorithm according to one embodiment of the invention. At 302, a query is received, and the received query is submitted to a search engine for execution on an index file. At 304, a list of index documents and a plurality of attributes are received from the search engine in response to the submitted query. At 306, a portion of the received list of index documents and the received plurality of attributes are stored in a subindex file. At 308, the received query is executed on the subindex file to obtain a list of subindex documents. At 310, one or more ranking algorithms are iteratively executed on the obtained list of subindex documents to rank the obtained list of subindex documents using the associated attributes. Thus, the one or more ranking algorithms produce one or more lists of ranked subindex documents. Moreover, each ranking algorithm includes a particular set of parameters, which may include the received query. A set or range of weights is also associated with a particular parameter.

At 312, each of the lists of ranked subindex documents is compared with a list of subjectively ranked documents associated with the received query to generate a score for each ranking algorithm. The list of subjectively ranked documents is generated by submitting the received list of index documents to a subjective ranking source and receiving the list of subjectively ranked documents from the subjective ranking source, which may be a human or a software program. Moreover, the received list of subjectively ranked documents may be stored in the subindex file. The score indicates a degree of correlation or similarity between a particular list of ranked subindex documents and the list of subjectively ranked documents. Additionally, information regarding a particular ranking algorithm and its score, information regarding another ranking algorithm and a score of the other ranking algorithm, and causal information relating a difference between the particular ranking algorithm and the other ranking algorithm with a difference between the scores of these ranking algorithms may be stored in an output file for analysis by an operator. In an embodiment of the invention, the ranking algorithms may be selected by a human or by a genetic algorithm. Alternatively, the ranking algorithms may be created by iteratively varying at least one of the parameters of a particular ranking algorithm.

At 314, an optimizing algorithm is applied to identify an optimal ranking algorithm as a function of the received query, the ranking algorithms, the lists of ranked subindex documents, and/or the list of subjectively ranked documents. In one embodiment of the invention, the optimizing algorithm may be a binary search algorithm, non-linear optimization technique, machine learning, neural network, regression model, etc. The optimal ranking algorithm produces a list of ranked subindex documents exhibiting an optimal degree of correlation with the list of subjectively ranked documents.

Exemplary Computer-Executable Components

Figure 4:
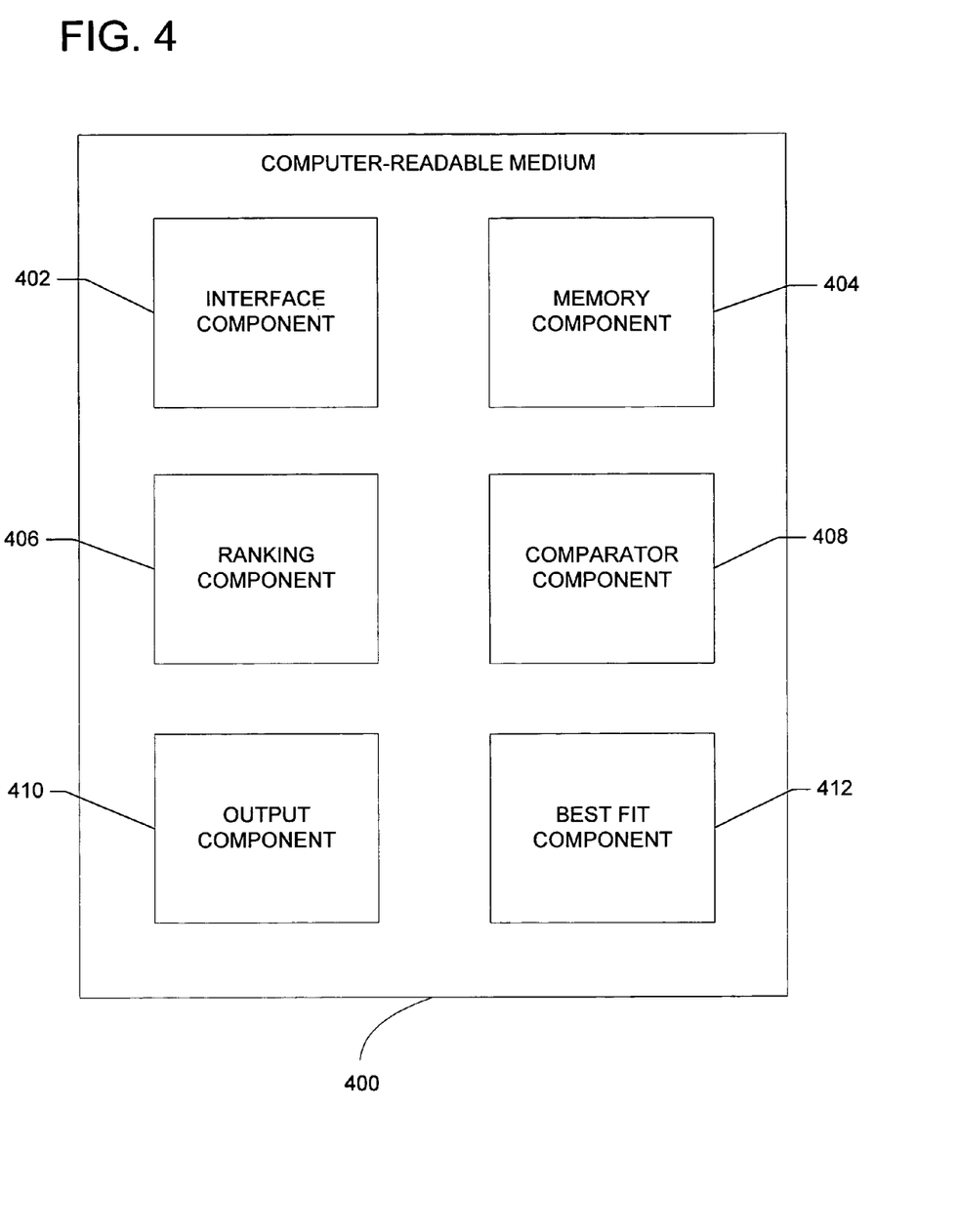
FIG. 4 is a block diagram illustrating an exemplary computer-readable medium according to one embodiment of the invention.

FIG. 4 is a block diagram illustrating an exemplary computer-readable medium 400 according to one embodiment of the invention. As shown, the computer-readable medium 400 includes an interface component 402, a memory component 404, a ranking component 406, a comparator component 408, an output component 410, and a best-fit component 412. However, it is contemplated that computer-readable medium 400 may be any quantity of computer readable media and may comprise various combinations of components and functionalities associated with each component.

The interface component 402 receives a query, a list of index documents resulting from execution of the query on an index file that stores a plurality of documents, and a plurality of attributes including data describing the list of index documents. The memory component 404 stores in a subindex file a portion of the list of index documents and the plurality of associated attributes received by interface component 402. Memory component 404 further stores the plurality of attributes including the query received by interface component 402. The ranking component 406 executes the received query on the subindex file to obtain a list of subindex documents and ranks, by a particular ranking algorithm, the obtained list of subindex documents using the associated attributes. The comparator component 408 compares the list of subindex documents ranked by ranking component 406 with a list of subjectively ranked documents to generate a score for the particular ranking algorithm. The generated score represents a degree of correlation or similarity between the list of subindex documents ranked by ranking component 406 and the list of subjectively ranked documents.

Ranking component 406 further ranks the obtained list of subindex documents using another ranking algorithm to obtain another list of ranked subindex documents and compares the other list of ranked subindex documents with the list of subjectively ranked documents to generate another score for the other ranking algorithm. The output component 410 stores in an output file information describing the particular ranking algorithm and its score, information describing the other ranking algorithm and the score of the other ranking algorithm, and causal information relating a difference between the particular ranking algorithm and the other ranking algorithm with a difference between the scores of these ranking algorithms.

In an embodiment of the invention, interface component 402 further receives input information including information describing a first ranking algorithm, a first score associated with the first ranking algorithm, a second ranking algorithm, a second score associated with the second ranking algorithm, and causal information relating a difference between the first ranking algorithm and the second ranking algorithm with a difference between the first score and the second score. The best-fit component 412 then applies an optimizing algorithm to the received input information to identify an optimal ranking algorithm having an optimal score. The optimal ranking algorithm is defined by a plurality of parameters and a plurality of weights associated with the plurality of parameters. The optimizing algorithm is interchangeable with another optimizing algorithm without recompilation of best-fit component 412.

Figure 5:
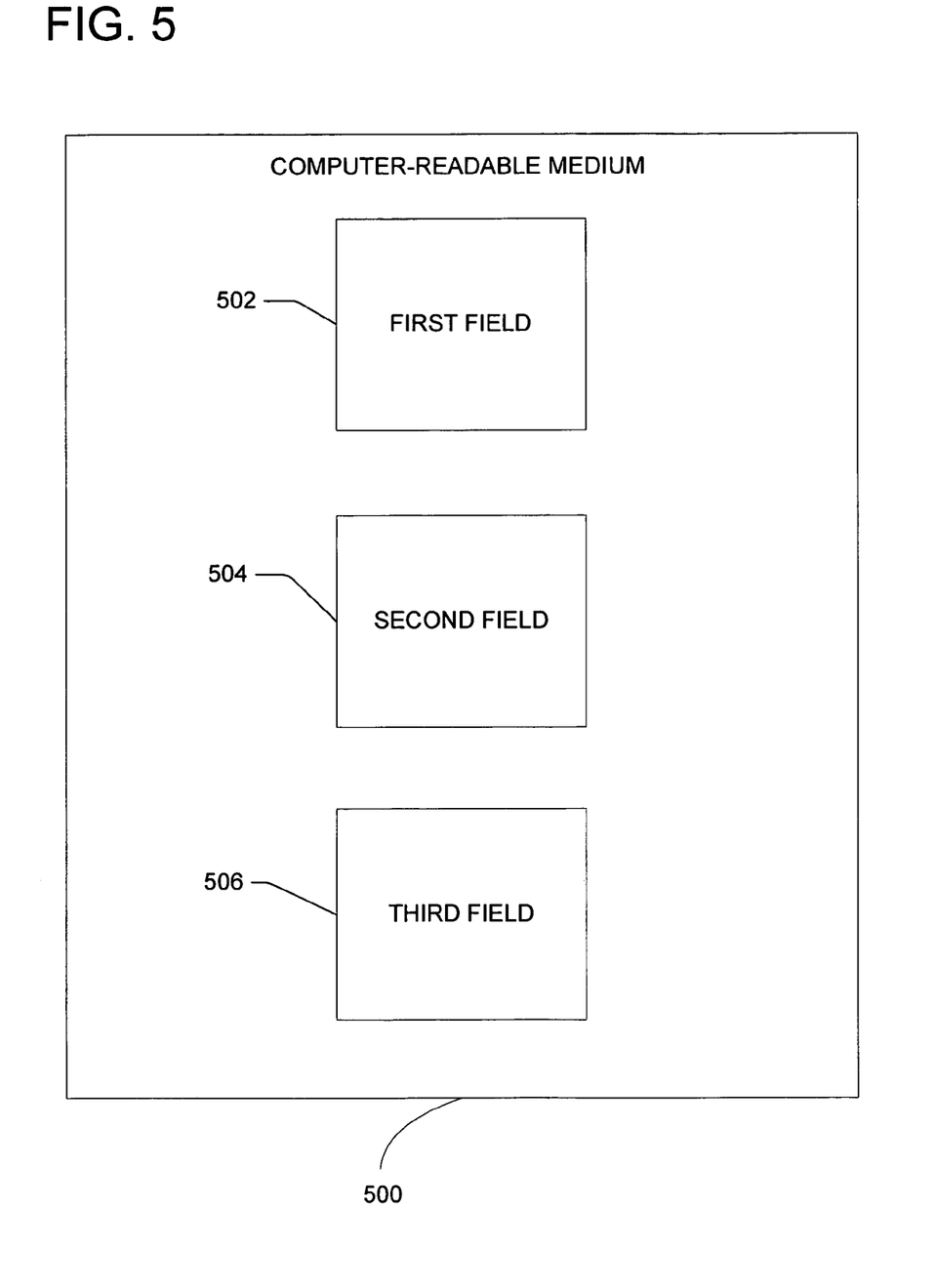
FIG. 5 is a block diagram illustrating another exemplary computer-readable medium according to one embodiment of the invention.

In FIG. 5, an exemplary computer-readable medium 500 according to one embodiment of the invention stores thereon a data structure representing a subindex file created from an index file as a function of a particular query executed on the index file. The execution of the particular query on the index file results in a list of documents. It is contemplated that computer-readable medium 500 may be any quantity of computer-readable media and may comprise various combinations of data structures and functionalities associated with each structure. As shown in FIG. 5, the data structure includes a first field 502, a second field 504, and a third field 506. The first field 502 stores a portion of the list of documents. The second field 504 stores a plurality of attributes related to the portion of the list of documents stored in first field 502. The third field 506 stores a list of subjectively ranked documents. The list of subjectively ranked documents is for use to identify an optimal ranking algorithm from a plurality of ranking algorithms by comparing rankings by the plurality of ranking algorithms of the portion of the list of documents stored in first field 502 with the list of subjectively ranked documents stored in third field 506.

Second field 504 also stores query dependent information such as one or more of the following: a query term, a frequency of the query term in a URL of an electronic document, a frequency of the query term in a title of the electronic document, a frequency of the query term in a body of the electronic document, and a frequency of the query term in an anchor text of the electronic document. Second field 504 further stores query independent information such as one or more of the following: link structure, age of an electronic document, depth of the electronic document within a domain, language of the electronic document, country of the electronic document, and a size of the electronic document.

Exemplary Operating Environment

Figure 6:
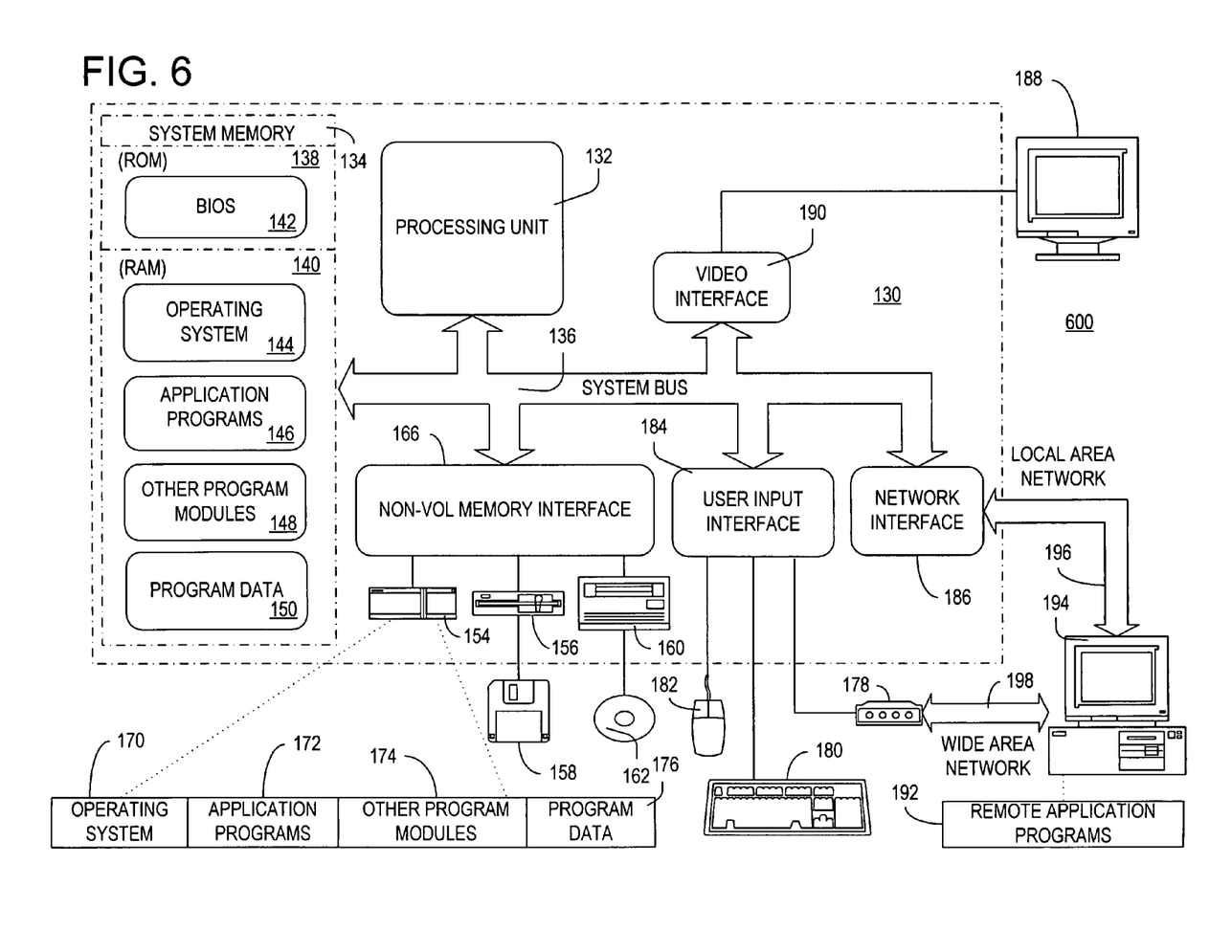
FIG. 6 is a block diagram illustrating an exemplary embodiment of a suitable computing system environment in which one embodiment of the invention may be implemented.

FIG. 6 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), including the basic routines that help to transfer information between elements within computer 130, such as during start-up, is typically stored in ROM 138. RAM 140 typically includes data and/or program modules that are immediately accessible to and/or presently being operated on by processing unit 132. By way of example, and not limitation, FIG. 6 illustrates operating system 144, application programs 146, other program modules 148, and program data 150.

The computer 130 may also include other removable/non-removable, volatile/nonvolatile computer storage media. For example, FIG. 6 illustrates a hard disk drive 154 that reads from or writes to non-removable, nonvolatile magnetic media. FIG. 6 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 6, provide storage of computer readable instructions, data structures, program modules and other data for the computer 130. In FIG. 6, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 6 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 6 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. Embodiments of the invention described herein include these and other various types of computer-readable storage media when such media include instructions or programs for implementing the steps described below in conjunction with a microprocessor or other data processor. One embodiment of the invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, one embodiment of the invention is operational with numerous other general purpose or special purpose computing system environments or configurations. The computing system environment is not intended to suggest any limitation as to the scope of use or functionality of embodiments of the invention. Moreover, the computing system environment should not be interpreted as having any dependency or requirement relating to any one or combination of components illustrated in the exemplary operating environment. Examples of well known computing systems, environments, and/or configurations that may be suitable for use with the embodiments of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Embodiments of the invention may also be practiced in distributed computing environments where tasks are performed by remote processing devices that are linked through a communications network. In a distributed computing environment, program modules may be located on both local and remote computer storage media including memory storage devices.

In operation, computer 130 executes computer-executable instructions such as those described herein to rate information retrieval ranking algorithms.

The order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of embodiments of the invention, it is intended that all matter contained in the above description and shown in the accompanying drawings shall be interpreted as illustrative and not in a limiting sense.

What is claimed is:

1. A method for rating information retrieval ranking algorithms, said method comprising:

receiving a query;

submitting the received query to a search engine for execution on an index file, said index file storing a plurality of documents;

receiving a list of index documents and a plurality of attributes from the search engine in response to the submitted query, said plurality of attributes including data describing the received list of index documents;

storing a portion of the received list of index documents and the received plurality of attributes associated therewith in a subindex file;

executing the received query on the subindex file to obtain a list of subindex documents;

ranking, by a ranking algorithm, the obtained list of subindex documents using the attributes associated therewith wherein the ranking algorithm has a plurality of parameters associated therewith;

comparing the list of ranked subindex documents with a list of subjectively ranked documents to generate a score for the ranking algorithm, said generated score representing a degree of correlation between the list of ranked subindex documents and the list of subjectively ranked documents;

varying at least one of the plurality of parameters to create another ranking algorithm;

ranking, by the created another ranking algorithm, the obtained list of subindex documents to obtain another list of ranked subindex documents;

comparing the another list of ranked subindex documents ranked by the another ranking algorithm with the list of subjectively ranked documents corresponding thereto to generate another score for the another ranking algorithm, said generated another score representing a degree of correlation between the another list of subindex documents ranked by the another ranking algorithm and the list of subjectively ranked documents;

storing in an output file the generated score, information describing the ranking algorithm, the another generated score, information describing the another ranking algorithm, and information relating a difference between the ranking algorithm and the another ranking algorithm with a difference between the generated score and the another generated score;

comparing the generated score and the another generated score to identify an optimal score representing the higher degree of correlation; and applying an optimizing algorithm to the output file to identify one of the ranking algorithm and the another ranking algorithm as an optimal ranking algorithm as a function of the identified optimal score, wherein the optimal ranking algorithm having the optimal score, said optimal ranking algorithm being defined by the plurality of parameters and a plurality of weights associated with the plurality of parameters, wherein the optimal score is a maximum possible score for any ranking algorithm defined by said plurality of parameters and said plurality of weights associated with said plurality of parameters ranking said obtained list of subindex documents.

2. The method of claim 1, further comprising:

submitting the received list of documents to a subjective ranking source; and receiving the list of subjectively ranked documents from the subjective ranking source.

3. The method of claim 2, further comprising storing the received list of subjectively ranked documents in the subindex file.

4. The method of claim 2, wherein the subjective ranking source comprises a human.

5. The method of claim 1, wherein the ranking algorithm includes a set of parameters.

6. The method of claim 1, wherein the plurality of attributes comprises the received query.

7. The method of claim 1, wherein the received query comprises a query term, and wherein the plurality of attributes comprises a frequency of the query term in documents in the list of index documents.

8. The method of claim 1, wherein the plurality of attributes comprises one or more of the following: link structure, age, depth within a domain, language, country, and size.

9. The method of claim 1, wherein applying the optimizing algorithm to the output file comprises applying a machine learning algorithm to the output file to identify the optimal ranking algorithm.

10. The method of claim 1, wherein a human selects the another ranking algorithm.

11. The method of claim 1, wherein the another ranking algorithm is selected by a genetic algorithm.

12. The method of claim 1, wherein the plurality of parameters comprises a plurality of weights associated with the plurality of parameters.

13. The method of claim 1, wherein receiving the query comprises receiving a web search query.

14. The method of claim 1, wherein receiving the query comprises receiving one or more of the following: a query for a business listing, a query for a residential listing, a query for a mail item, a query for a news item, a query for media content, and a product query.

15. The method of claim 1, wherein one or more computer-readable storage media have computer-executable instructions for performing the method recited in claim 1.

16. One or more computer-readable storage media having computer-executable components for rating information retrieval ranking algorithms, said components comprising:

an interface component for receiving a query, a list of index documents resulting from execution of the query on an index file storing a plurality of documents, and a plurality of attributes including data describing the list of index documents;

a memory component for storing, in a subindex file, a portion of the list of index documents and the plurality of attributes associated therewith received by the interface component;

a ranking component for executing the received query on the subindex file to obtain a list of subindex documents and for ranking, by a ranking algorithm, the obtained list of subindex documents using the attributes associated therewith wherein the ranking algorithm has a plurality of parameters associated therewith, for varying at least one of the plurality of parameters to create another ranking algorithm, and for ranking, by the created another ranking algorithm, the obtained list of subindex documents to obtain another list of ranked subindex documents;

a comparator component for comparing the list of subindex documents ranked by the ranking component with a list of subjectively ranked documents to generate a score for the ranking algorithm, said generated score representing a degree of correlation between the list of subindex documents ranked by the ranking component and the list of subjectively ranked documents and for comparing the another list of ranked subindex documents ranked by the ranking component with the list of subjectively ranked documents to generate another score for the another ranking algorithm, said generated another score representing a degree of correlation between the another list of ranked subindex documents ranked by the ranking component and the list of subjectively ranked documents;

an output component for storing in an output file the score, information describing the ranking algorithm the another score, information describing the another ranking algorithm, and information relating a difference between the ranking algorithm and the another ranking algorithm with a difference between the score and the another score; and a best-fit component for comparing the generated score and the another generated score to identify an optimal score representing the higher degree of correlation, said best-fit component further identifying one of the ranking algorithm and the another ranking algorithm as an optimal ranking algorithm as a function of the identified optimal score, wherein the optimal ranking algorithm having the optimal score, said optimal ranking algorithm being defined by the plurality of parameters and a plurality of weights associated with the plurality of parameters, wherein the optimal score is a maximum possible score for any ranking algorithm defined by said plurality of parameters and said plurality of weights associated with said plurality of parameters ranking said obtained list of subindex documents.

17. The computer-readable storage media of claim 16, wherein the memory component further stores the plurality of attributes including the query received by the interface component.

* * * * *

UNITED STATES PATENT AND TRADEMARK OFFICE
CERTIFICATE OF CORRECTION

| | | |
|---|---|---|
| PATENT NO. | : 7,363,296 B1 | Page 1 of 1 |
| APPLICATION NO. | : 10/883108 | |
| DATED | : April 22, 2008 | |
| INVENTOR(S) | : Ramez Naam et al. | |

It is certified that error appears in the above-identified patent and that said Letters Patent is hereby corrected as shown below:

In column 18, line 19, in Claim 16, after "ranking algorithm" insert -- . --.

Signed and Sealed this

Fifteenth Day of February, 2011

David J. Kappos
*Director of the United States Patent and Trademark Office*